March 11, 1958  H. B. WRIGHT  2,826,213
GAS CONTROL VALVE
Filed Dec. 29, 1951  2 Sheets-Sheet 2

Inventor
Harold B. Wright
by Bair, Freeman & Molinare
Attys.

United States Patent Office 2,826,213
Patented Mar. 11, 1958

2,826,213

GAS CONTROL VALVE

Harold B. Wright, Marshalltown, Iowa, assignor to Fisher Governor Co., Marshalltown, Iowa, a corporation of Iowa Application December 29, 1951, Serial No. 264,059

8 Claims. (Cl. 137—116.3)

The present invention relates to an improved gas pressure control valve of the type intended to release high pressure gas to an outlet passage at controlled outlet pressure and embodying gas escape mechanism to provide harmless escape of gas in the event that the valve closing action is incapable of confining outlet pressure to a prescribed maximum valve. The invention also relates to a gas escape valve for use with control valve of the above type.

In one type of gas distribution system, the gas is piped at a relatively high pressure, such as fifteen pounds per square inch. This high pressure gas is passed through a suitable pressure control valve which interposes a varying and controlled resistance to the passage of gas to maintain the outlet pressure within the pressure range required by the user. Such utilization pressure may, for example, be six ounces, a very small fraction of the distribution pressure.

If, for any reason, such as excessive supply pressure or valve sticking, the gas regulating valve is ineffective, a very dangerous situation may develop for pressures in the range of fifteen pounds may be impressed on appliances intended for operation at six ounces. Such over-pressure invites leaks with the consequent chance of an explosive gas mixture and an explosion.

In accordance with the present invention the above danger is avoided by providing gas escape valve mechanism integral with the main control valve and responsive to its operations. This gas escape mechanism functions in response to predetermined outlet pressure to release the gas harmlessly to the atmosphere without exposing appliances to that pressure. Since the regulating valve can readily be located in place where the escaping gas can be dissipated, the danger of explosion is overcome.

It is, therefore, a general object of the present invention to provide an improved gas pressure regulating valve with integral means to release high pressure gas.

Another object of the present invention is to provide an improved escape valve mechanism for a gas pressure regulating valve. Still another object of the present invention is to provide a gas pressure regulating valve and escape mechanism that is simple and reliable in construction and inexpensive to the end that a device suitable for general use is achieved.

Another object of the present invention is to provide an improved gas pressure regulating valve and escape mechanism that operates in response to diaphragm movement.

Further it is an object of the present invention to provide an improved gas pressure regulating valve and escape mechanism that senses the difference between main valve motion as called for by the diaphragm and actual valve motion and triggers the gas escape in response to that difference.

The novel features which I believe to be characteristic of my invention are set forth with particularity in the appended claims. My invention itself, together with further objects and advantages thereof, may best be understood by reference to the following description taken in connection with the following drawings, in which:

Figure 1:
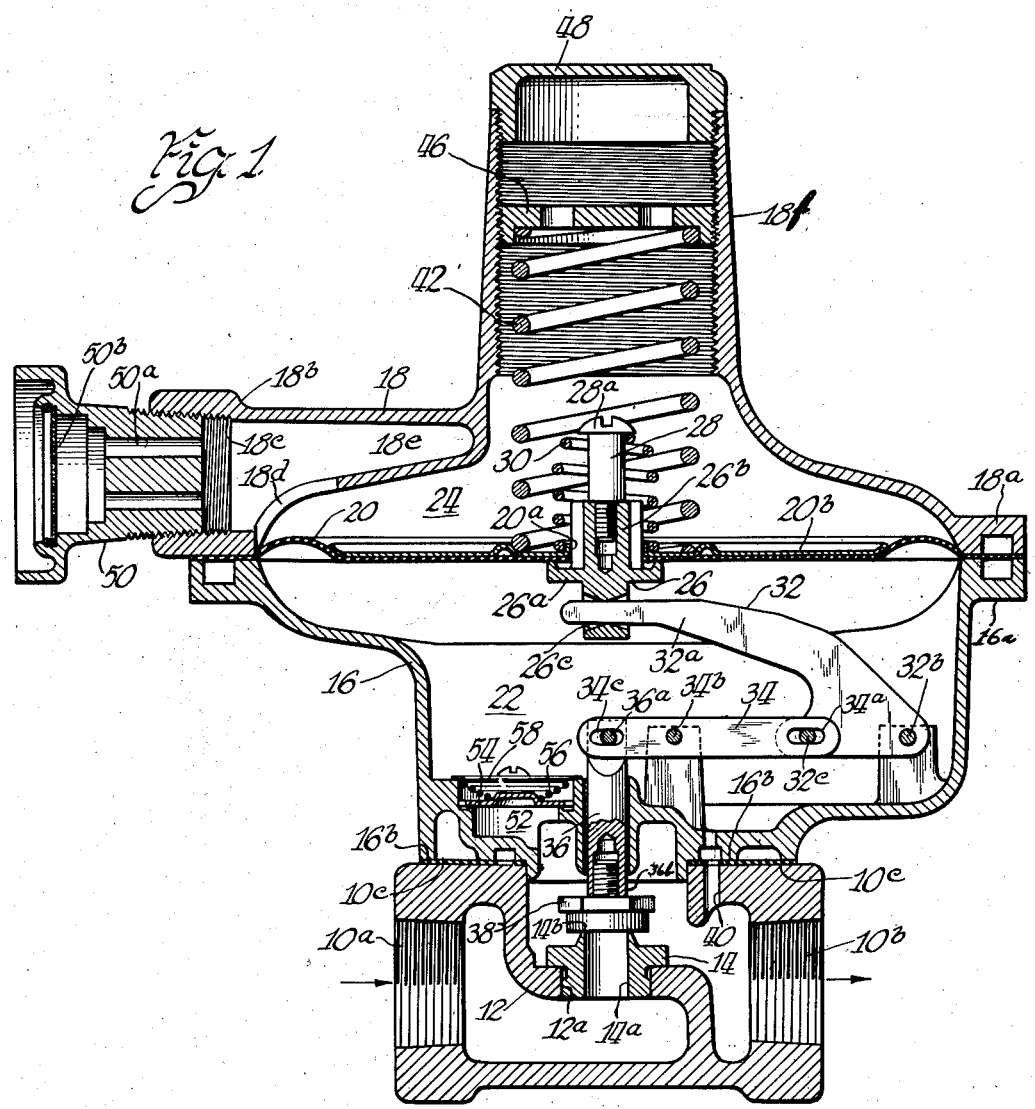
Figure 1 is a view in axial cross-section showing an embodiment of the present invention under normal operation.

Referring now to Figure 1 there is shown at 10 the main valve housing having an inlet chamber 10a and an outlet chamber 10b separated by the web 12. The web 12 is apertured at 12a and threadedly receives the valve seat member 14 which has a cylindrical part 14a and defines an annular valve seat 14b.

Casings 16 and 18 receive the periphery of the diaphragm 20 between their flange portions 16a and 18a, respectively. The flange portions are clamped together by suitable means (not shown) so that together the casings define a diaphragm chamber which is divided into two parts or spaces 22 and 24 by the diaphragm 20. The unitary structure thus formed is secured at its face portion 16b to the mating face 10c of the housing 10 by suitable means (not shown).

The diaphragm 20 is apertured at 20a and receives the valve plunger 26. This plunger has a valve seating or cap part 26a which, when held against the diaphragm, closes the aperture 20a to prevent the escape of gas therethrough. This plunger also has a fluted centering stem 26b which holds the valve in centered position in relation to the aperture 20a while permitting the escape of gas from space 22 into space 24 when the cap part 26a is spaced from the diaphragm 20. The stem 26b has a threaded opening that receives the headed screw 28. The head 28a of this screw receives the small end of the tapered biasing spring 30 which at its large end seats on the diaphragm 20. Thus the valve 26 normally has a closed position under the bias of the spring 30 but opens when this bias is overcome.

At its end 26c, the valve 26 has a slot which receives the end 32a of the rocker arm 32. This rocker arm is pivoted at 32b and at 32c carries a pin which extends laterally into the elongated slot 34a of the lever 34. Lever 34 is pivotally supported at 34b and on the end opposite the pivot has an elongated slot 34c.

Slot 34c receives the pin 36a which is integral with the stem 36. This stem is threadedly secured at end 36b to the valve body 38 which seats on the valve seat 14b to control the passage of gas through the opening 14a.

Thus, as the diaphragm 20 flexes in response to pressure variations, the arm 32 is rocked, lever 34 is tilted, and the valve 38 lifted or lowered, thus opening and closing the passage 14a.

The passage 40 is formed by mating openings in the housing 10 and the housing 16 which provide a path for gas communication between outlet chamber 10b and the space 42 defined by the diaphragm 20 and the housing 16. This passage causes the pressure in chamber 22 to partake of the pressure of the outlet chamber 10b. Since the valve 38 closes as the diaphragm 20 flexes upwardly in response to increased pressure, the unit acts as a pressure regulator to tend to maintain the outlet pressure in chamber 10b at a constant value.

The passage 40 is made of restricted size so that the pressure in space 22 does not change as rapidly as the pressure in chamber 10b. This is desirable to decrease the tendency of the regulator to be unstable or to hunt. These considerations of stability preclude the use of a large passage 40.

The diaphragm 20 is biased downwardly by the spring 42 which seats at one end against the diaphragm plate 20b and at the other end bottoms against the internal nut 46 which is threadedly received in the protruding knob 18f of the housing 18. The nut 46 can be adjusted to vary the spring tension and hence the regulated pressure of the chamber 10b. The cap 48 is threadedly received in the knob 18f to seal the same.

The housing 18 has an additional protuberance 18b which has a threaded pipe—receiving end 18c. This threaded end is in communication with the space 24 by reason of the aperture or escape outlet 18d in the web 18e between the space 24 and the interior of the protuberance 18b.

A cap 50 is threadedly received in the protuberance 18b and forms a weather proof vent for the space 24. This cap includes passages 50a and screen 50b which prevent the admission of foreign matter while permitting the gas to escape.

The flow of gas through the passage 40 is supplemented by the much larger passage 52 which has an enlarged seat defining portion adjacent space 22. The valve 54 seats on the seat portion of passage 52 and is biased to closed or seated position by the conical spring 56. The loaded spring 56 bottoms against perforated cap 58 which is secured to the housing 16. Thus the passage 52 is sealed until the gas pressure differential across the valve 54 reaches the value required to overcome the spring 56.

Operation

Under normal conditions of gas pressure, the diaphragm 20 receives the outlet gas pressure in space 22 and the atmospheric pressure in space 24. As the gas pressure rises, the diaphragm flexes to move the valve 38 toward the closed position. As the gas pressure falls, the reverse operation occurs. Hence the valve operates to maintain constant outlet gas pressure.

In the event that excessive inlet pressure exists, and especially if the valve 38 does not seat tightly on the seat 14b, the pressure in the outlet 10b may be excessive even though the valve 38 is at its maximum point of travel. In this case, shown in Figure 2, the diaphragm 20 flexes under the gas pressure and the valve 38, lever 34, and rocker 32 are held against motion. The spring 30 is thereby compressed and gas escapes through valve 26 and out space 24 and cap 50.

If, due to foreign matter on the valve seat 14b, or for some other cause, the diaphragm 20 is incapable of reducing the gas pressure in the outlet 10b to the desired value, the diaphragm 20 flexes under the excessive gas pressure but the rocker 32, which can only move with the valve 38, cannot do so. The spring 30 is accordingly compressed and the valve 26 lifted in relation to the diaphragm 20 to define a path for the escape of gas from the space 22 to the space 24 and hence to the atmosphere through the escape pipe 50. This condition is shown in Figure 3.

Figure 2:
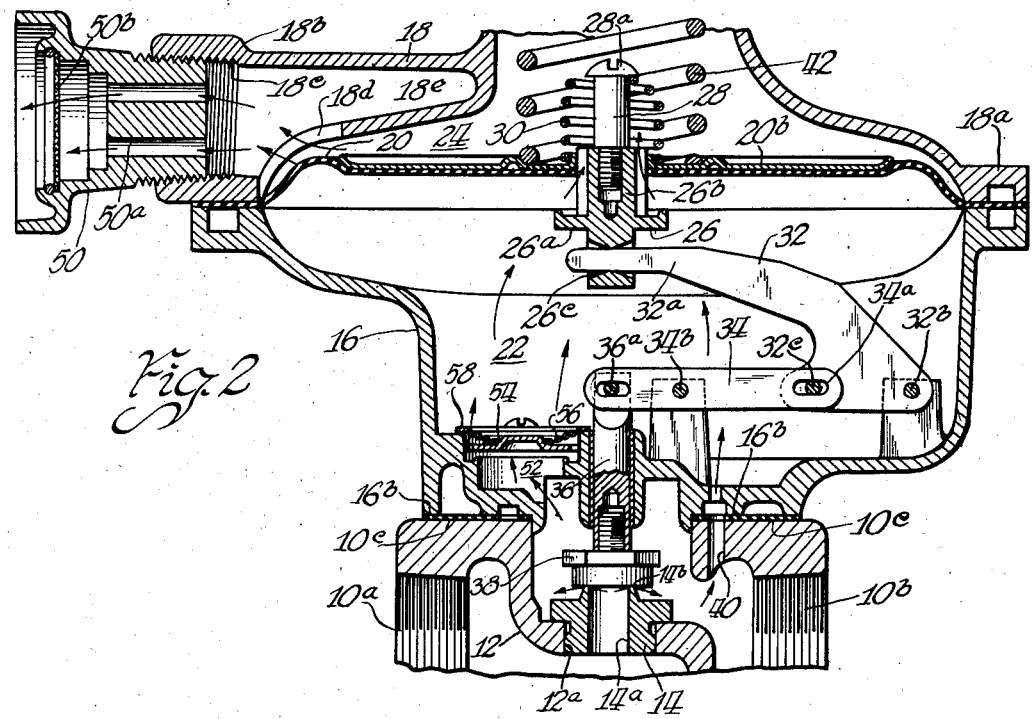
Figure 2 is a fragmentary view like Figure 1 but showing the apparatus under gas dumping operation incident to excessive inlet pressure.
Figure 3:
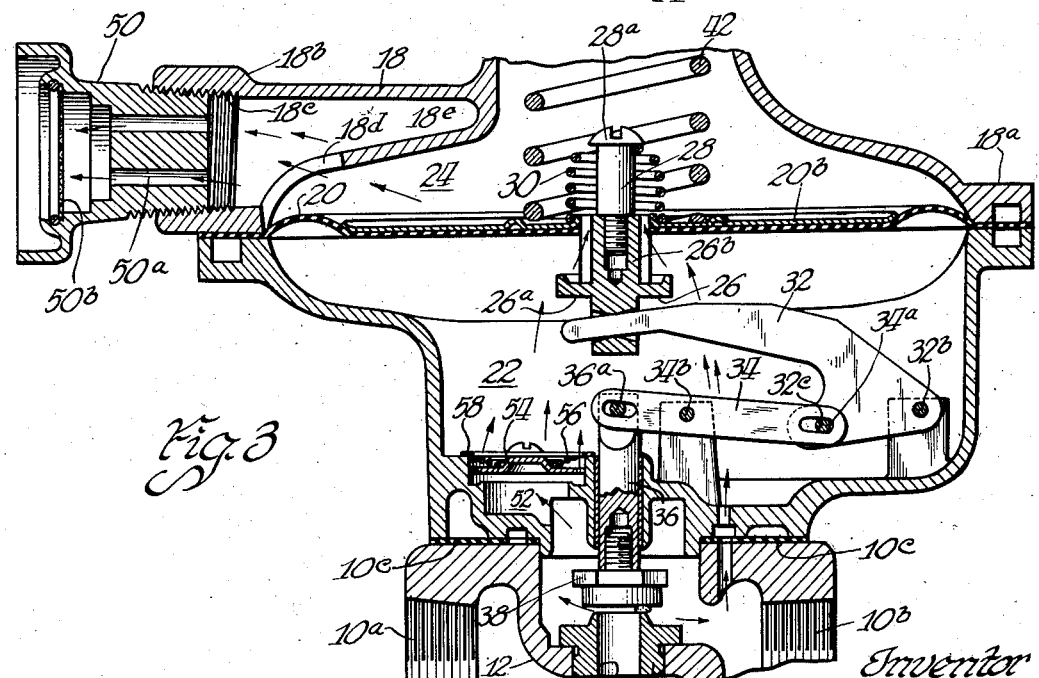
Figure 3 is a fragmentary view like Figure 1, but with the apparatus dumping gas as a result of foreign matter in the main valve.

When, as in the conditions shown in Figures 2 and 3, the pressure in the chamber 10b is sufficiently great to open the valve 26, it is also sufficient to open valve 54 to define an unimpeded path for gas flow from the chamber 10b to the space 22. This permits relatively free escape of gas to prevent undue pressure buildup in the space 10b.

It will be noted that the valve 26 senses the difference between motion of the valve 28 and flexure of the diaphragm 20. This valve accordingly responds to impediments to valve motion regardless of the degree the valve is open. In fact, the valve 26 may open when the valve 38 is fully open if, for any reason, the valve 38 is restrained and cannot move in the closing direction.

Moreover, the passage 40 can be of the small cross-section dictated by considerations of regulating stability. Since valve 54 forms an unrestricted escape this limitation on the size of passage 40 does not prevent effective safety operation.

While I have shown a specific embodiment of the present invention, it will, of course, be understood that any modifications and alternative constructions may be made without departing from the true spirit and scope. I, therefore, intend by the appended claims to cover all modifications and alternative constructions within their true spirit and scope.

What I claim is:

1. In a gas pressure regulating valve the combination of: a valve housing having an inlet chamber, and an outlet chamber, and defining a valve seat therebetween; a diaphragm housing defining a diaphragm chamber; a diaphragm in the diaphragm housing dividing the same into two spaces, the valve housing and the diaphragm housing having therein a pair of passages from the outlet chamber to one of said spaces, one passage being restricted in size, the diaphragm housing further defining an escape outlet from the other of said spaces; a main valve linked to the diaphragm and extending into the valve housing to close the valve as pressure in said one of said spaces increases; a pressure controlled valve in the other of said pair of passages and operable to open when the pressure in the outlet chamber exceeds the pressure in said one of said spaces by a predetermined amount, and an escape valve operable in response to the motion of the diaphragm under predetermined high pressure in said one of said spaces to open and define gas escape passage about the diaphragm communicating said one of said spaces with said escape outlet.

2. In a gas pressure regulating valve the combination of: a valve housing having an inlet chamber, an outlet chamber, and defining a valve seat therebetween; a diaphragm housing defining a diaphragm chamber; a diaphragm in the diaphragm housing dividing the same into two spaces, the valve housing and the diaphragm housing having therein a pair of passages from the outlet chamber to one of said spaces, one passage being restricted in size, the diaphragm housing further defining an escape outlet from the other of said spaces; a main valve linked to the diaphragm and extending into the valve housing to close the valve as pressure in said one of said spaces increases; a pressure controlled valve in the other of said pair of passages and operable to open when the pressure in the outlet chamber exceeds the pressure in said one of said spaces by a predetermined amount, and an escape valve connected to the diaphragm and to said main valve and operable to open upon predetermined relative movement thereof to define gas escape passage about the diaphragm communicating said one of said spaces with said escape outlet.

3. In a gas pressure regulating valve the combination of: a valve housing having an inlet chamber, an outlet chamber, and defining a valve seat therebetween; a diaphragm housing defining a diaphragm chamber; a diaphragm in the diaphragm housing dividing the same into two spaces, the valve housing and the diaphragm housing having therein a pair of passages from the outlet chamber to one of said spaces, one passage being restricted in size, the diaphragm housing further defining an escape outlet from the other of said spaces; a main valve linked to the diaphragm and extending into the valve housing to close the valve as pressure in said one of said spaces increases; a pressure controlled valve in the other of said pair of passages and operable to open when the pressure in the outlet chamber exceeds the pressure in said one of said spaces by a predetermined amount, the diaphragm having an aperture providing communication between said two spaces; and an escape valve adapted to seat on said aperture and connected to the main valve and operable to open upon predetermined relative movement of the main valve and the diaphragm to define a gas escape passage about the diaphragm communicating said one of said spaces with said escape outlet.

4. In a diaphragm type gas pressure control valve the improvement comprising: a housing defining a gas inlet chamber, a gas outlet chamber, and a valve seat between said chambers, a diaphragm housing defining a diaphragm chamber; a diaphragm in said last chamber and dividing the same into two spaces, the housing having therein a small passage and a large passage between the outlet chamber and one of said spaces, the housing further having therein an escape passage from the other of said spaces; a valve adapted to seat on said valve seat; a linkage yieldably connecting the valve to the diaphragm to close the valve as the diaphragm moves in response to increased pressure in said one of said spaces; an escape valve connected to the linkage and to the diaphragm and operable in response to relative motion therebetween to form a gas escape passage across the diaphragm; and, a pressure actuated release valve in said large passage operable to open upon a predetermined pressure difference between the outlet chamber and said one of said spaces.

5. In a gas pressure regulator of the type having an inlet chamber, an outlet chamber, a passage between the chambers, and a main valve movable to control gas flow between the chambers, the improvement comprising: a housing having therein a diaphragm chamber; an apertured diaphragm in said chamber dividing the same into two spaces, the housing having therein a small passage and a large passage from the outlet chamber to one of said spaces, and said main valve extending into said one of said spaces, the housing further defining an escape port from the other of said spaces; an escape valve adapted to close the aperture in the diaphragm and biased to the aperture closing position; a linkage extending from the escape valve to the main valve and operable to close the main valve as the pressure in said one space increases and upon increased motion of the diaphragm to open the escape valve against its bias, and a pressure responsive valve in said large passage operable to open when the pressure gradient therein exceeds a predetermined value.

6. A gas service pressure regulator including in combination, a diaphragm, front and back diaphragm cases enclosing and edge-supporting the diaphragm, a valve fitting mounted on the diaphragm case and having high pressure inlet and low pressure outlet chambers connected by a passage, a valve member controlling said passage, an operative connection between said member and said diaphragm, a constantly open restricted flow passage between said low pressure chamber and the front diaphragm case, a constantly open large vent passage in the rear case, a relief valve in the diaphragm opening from front to rear thereof on excess pressure, a large flow passage between said low pressure chamber and the front diaphragm case, and a spring closed check valve closing said large flow passage and openable toward the front diaphragm case whereby excess pressure in the low pressure chamber will exhaust through the check valve, the diaphragm valve and through the vent in the rear case.

7. In a gas service pressure regulator having a pressure regulating valve between gas inlet and discharge chambers, a valve actuating diaphragm housed in front and back cases and a restricted gas flow connection between the discharge chamber and the front diaphragm case, in combination, a relief valve adapted to discharge from the front to the back case, a vent for the back case having an always open flow area at least equal to that of the relief valve, a by-pass for said gas flow connection having a capacity of the order of said relief valve, a valve for said by-pass openable toward the front case and means biasing said relief valve closed at normal discharge chamber pressures.

8. In a diaphragm equipped gas pressure regulator of the type having a Pitot tube connection between the low pressure outlet of the regulator and the front or active chamber of the diaphragm housing, and having a rear or vented chamber on the opposite side of the diaphragm, in combination, a relief valve mounted in the diaphragm to discharge from the front chamber to the back one, an always fully open vent for the back chamber having a discharge capacity of the order of the flow capacity of the regulator, a high capacity by-pass passage for the said Pitot tube, a spring pressed valve closing said passage and adapted to open toward the front chamber when the pressure at the Pitot tube inlet end in said regulator low pressure outlet becomes excessive.

References Cited in the file of this patent

UNITED STATES PATENTS

| | | |
|---|---|---|
| 793,947 | Millett | July 4, 1905 |
| 1,972,170 | Spencer | Sept. 4, 1934 |
| 2,212,626 | Thomas | Aug. 27, 1940 |
| 2,239,116 | Ray | Apr. 22, 1941 |
| 2,306,746 | Niesemann | Dec. 29, 1942 |
| 2,543,203 | Roney | Feb. 27, 1951 |
| 2,577,480 | Peterson | Dec. 4, 1951 |
| 2,664,674 | Niesemann | Jan. 5, 1954 |

FOREIGN PATENTS

| | | |
|---|---|---|
| 654,608 | Germany | Dec. 27, 1937 |